(12) United States Patent
Maga et al.

(10) Patent No.: US 7,537,926 B2
(45) Date of Patent: May 26, 2009

(54) BIOREACTOR SYSTEM FOR BIOLOGICAL DEGRADATION OF OILY SLUDGE

(75) Inventors: Gerardo F. Maga, Thousand Oaks, CA (US); Frederick E. Goetz, Oxnard, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/165,769

(22) Filed: Jul. 1, 2008

(65) Prior Publication Data

US 2008/0264856 A1 Oct. 30, 2008

Related U.S. Application Data

(63) Continuation of application No. 10/975,124, filed on Oct. 25, 2004, now Pat. No. 7,439,054, which is a continuation of application No. 10/943,653, filed on Sep. 3, 2004, now Pat. No. 7,445,927.

(51) Int. Cl.
*C02F 3/34* (2006.01)
*C14C 1/00* (2006.01)
*C12M 1/00* (2006.01)
*C12M 3/00* (2006.01)

(52) U.S. Cl. .................... 435/262; 435/265; 435/289.1

(58) Field of Classification Search ................. 435/262, 435/265, 289.1
See application file for complete search history.

(56) References Cited

U.S. PATENT DOCUMENTS

| | | | | |
|---|---|---|---|---|
| 3,841,998 A | * | 10/1974 | Farrell | 210/622 |
| 4,723,968 A | * | 2/1988 | Schippert et al. | 95/205 |
| 5,635,394 A | * | 6/1997 | Horn | 435/266 |
| 6,464,875 B1 | * | 10/2002 | Woodruff | 210/603 |
| 7,439,054 B1 | * | 10/2008 | Maga et al. | 435/265 |
| 7,445,927 B2 | * | 11/2008 | Maga et al. | 435/289.1 |
| 2002/0079266 A1 | * | 6/2002 | Ainsworth et al. | 210/603 |
| 2003/0201225 A1 | * | 10/2003 | Josse et al. | 210/605 |

FOREIGN PATENT DOCUMENTS

GB 2320492 A * 6/1998

* cited by examiner

*Primary Examiner*—Walter D Griffin
*Assistant Examiner*—Lydia Edwards
(74) *Attorney, Agent, or Firm*—David S. Kalmbaugh

(57) ABSTRACT

A 10,000 gallon sequencing batch reactor tank for the on-site bio-degradation of oily sludge. Bacteria already present in and adapted to oily sludge degrade the hydrocarbons found in oily sludge within two weeks from 20,000 ppm to less than 100 ppm. A degradation cycle requires 5 days. After five days a recirculation pump and aeration system are turned off and solids are allowed to settle to the bottom of the tank. An ultrafiltration unit connected to the tank requires approximately 16 hours to process the contents of the reactor tank.

16 Claims, 7 Drawing Sheets

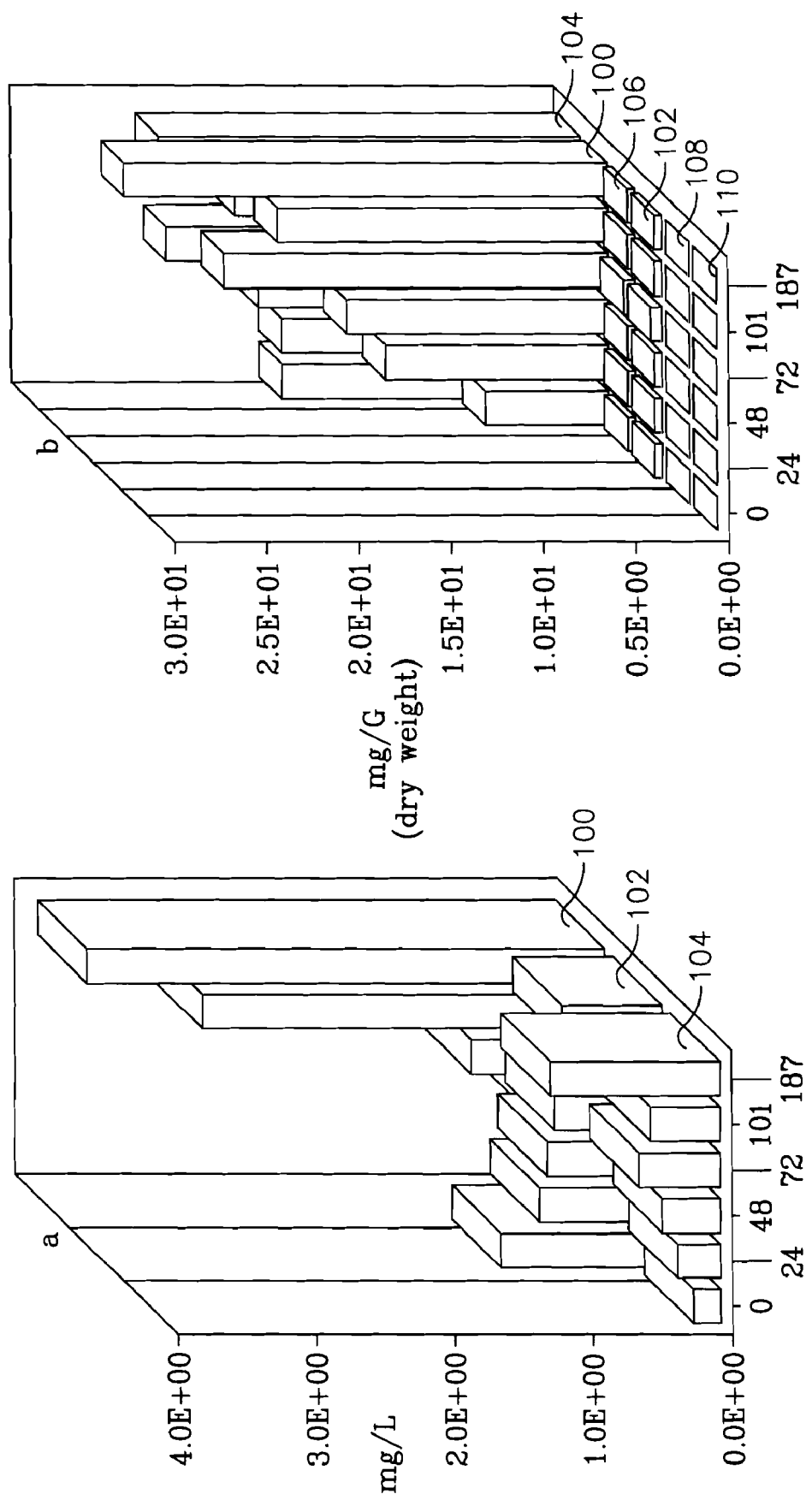

BIOREACTOR SYSTEM FOR BIOLOGICAL DEGRADATION OF OILY SLUDGE

This application is a continuation of U.S. patent application Ser. No. 10/975,124, filed Oct. 25, 2004 now U.S. Pat. No. 7,439,054, which is a continuation of U.S. patent application Ser. No. 10/943,653, filed Sep. 3, 2004 now U.S. Pat. No. 7,445,927.

BACKGROUND OF THE INVENTION

1. Field of the Invention

The present invention relates generally to the disposal of oily sludge. More specifically, the present invention relates to an apparatus and method for the biological degradation of oily sludge with the apparatus comprising a sequencing batch reactor for the on-site degradation of oily sludge.

2. Description of the Prior Art

Biological treatment facilities and processes are increasingly used to treat a wide variety of organic rich waste streams. The most common application of biological treatment of waste is sewage treatment. Food processors, feed lots, the paper industry, oil refineries, and the automotive industry often use on-site biological treatment processes for high biological demand waste. In most applications, biological treatment facilities/systems are designed to promote the growth of naturally occurring bacteria adapted to grow on and degrade the targeted waste. The basic requirements are that the system be well mixed, maintain a near neutral pH, and for most applications operate aerobically. To reduce the amount of residual biomass and to generate methane which is captured and used as fuel, some waste streams are treated anaerobically by biological treatment systems. To accommodate the longer residence times needed to treat waste anaerobically, the capacity of the treatment system is often much larger than a corresponding aerobic system. When treating industrial waste as opposed to sewage, nitrogen, phosphorus, and low concentrations of vitamins are added to promote bacterial growth. In recent years, technological enhancements, e.g., trickling filters, rotating bio contactors, and activated sludge systems have been developed to maximize bacterial contact with the waste and reduce processing time for treating the waste. For most applications a simple stirred tank reactor is sufficient.

Biological treatment will remove more than ninety percent of suspended organic solids and it is the most cost effective treatment available for dissolved organics. Although significant progress has been made in treating compounds once considered recalcitrant, biological treatment of some organic pollutants, such as PCB's is not yet practicable. High concentrations of heavy metals, solvents, salt, and extremes of pH or temperature will hinder and in some cases poison biological treatment systems. These effects are usually transient and systems rapidly recover when normal conditions are restored.

Vigorous aeration of a treatment reactor produces air emissions and the degradation process itself may produce volatile compounds. These compounds are usually biodegradable and one treatment process currently being used passes exhaust air through containers filled with compost, this process being known as biofiltration. Bacteria in the compost capture and degrade volatile hydrocarbons and some inorganic species, e.g., hydrogen sulfide and ammonia. Biological treatment produces a residue that is primarily biomass, i.e., bacteria and cell remnants. The volume depends on the capacity of the system and the residence time in the reactor. Since biomass is recycled and broken down during each reactor cycle, the total amount of biomass increases slowly. Most industrial applications produce 1 to 2% of reactor sludge per gallon of treated oily wastewater. Unless the concentration of metals exceeds allowable limits, the residue is usually non-toxic and non-hazardous and can be captured in a filter press, bag filter, landfarmed, landfilled, or composted.

Department of Defense (DOD) military facilities generate thousands of tons of oily sludge annually at industrial wastewater treatment plants, wash racks, fuel depots, industrial operations, and maintenance facilities. Since oily sludge cannot be recycled or burned, it is drummed and stored at landfills. The disposal cost to the Department of the Navy is in excess of $6.5 M per year. Due to increasing costs, long-term liability, and restrictions on landfill disposal, there is an urgent need for a cost effective on-site treatment.

Navy research efforts concluded that bacteria already present in and adapted to oily sludge from a variety of sources degrade the hydrocarbons found in oily sludge within 2 weeks from 20,000 ppm to less than 100 ppm. In addition, research found that the concentrations of heavy metals, which are primarily zinc and copper, and total suspended solids in treated sludge residuals were well below mandated discharge limits. The results of the research demonstrated that on-site biological treatment was technically and economically feasible to the Military.

SUMMARY OF THE INVENTION

The present invention overcomes some of the difficulties of the past including those mentioned above in that the invention comprises a relatively simple yet highly effective apparatus and method for the cost effective on-site treatment of oily sludge and similar industrial waste. Bacteria already present in and adapted to oily sludge from a variety of sources degrade the hydrocarbons found in oily sludge within two weeks from 20,000 ppm to less than 100 ppm. In addition, the concentrations of heavy metals (primarily zinc and copper) and total suspended solids in treated sludge residuals remain well below discharge limits.

A receiver tank receives oily sludge. The oily sludge is diluted with water and supplied to a sequencing batch reactor tank where biodegradation occurs. The reactor tank has a recirculation line and recirculation pump. The inlet port of the recirculation pump is connected to a nutrient tank so that a concentrated solution of nutrients which includes nitrogen, phosphorus, and commercial products that provide amino acids and vitamins is pumped directly into the recirculation line.

To neutralize carboxylic acids produced during initial degradation of hydrocarbons and maintain a near neutral pH, a pH controller and pump are used to pump 50% sodium hydroxide into the recirculation line.

At the end of a reaction cycle, an aeration system at the bottom of the reactor tank and recirculation pump are turned off from a controller and solids settle to the bottom of the reactor tank. After settling to the bottom of the reactor tank, supernatant and solids are passed through a bag filter and an ultrafiltration unit. Suspended solids which are primarily biomass are recycled to the receiving tank. The bag filter which is upstream from the ultrafiltration unit removes larger particles which reduces fouling of the ultrafiltration membranes. Clean effluent from the ultrafiltration unit is sent to a 20,000 gallon holding tank.

BRIEF DESCRIPTION OF THE DRAWINGS

FIG. 6 depicts supernatants and solids which accumulate in the reactor tank in a liquid phase of biological degradation; and FIG. 7 depicts supernatants and solids which accumulate in the reactor tank as solids.

DETAILED DESCRIPTION OF THE PREFERRED EMBODIMENT

Figure 1:
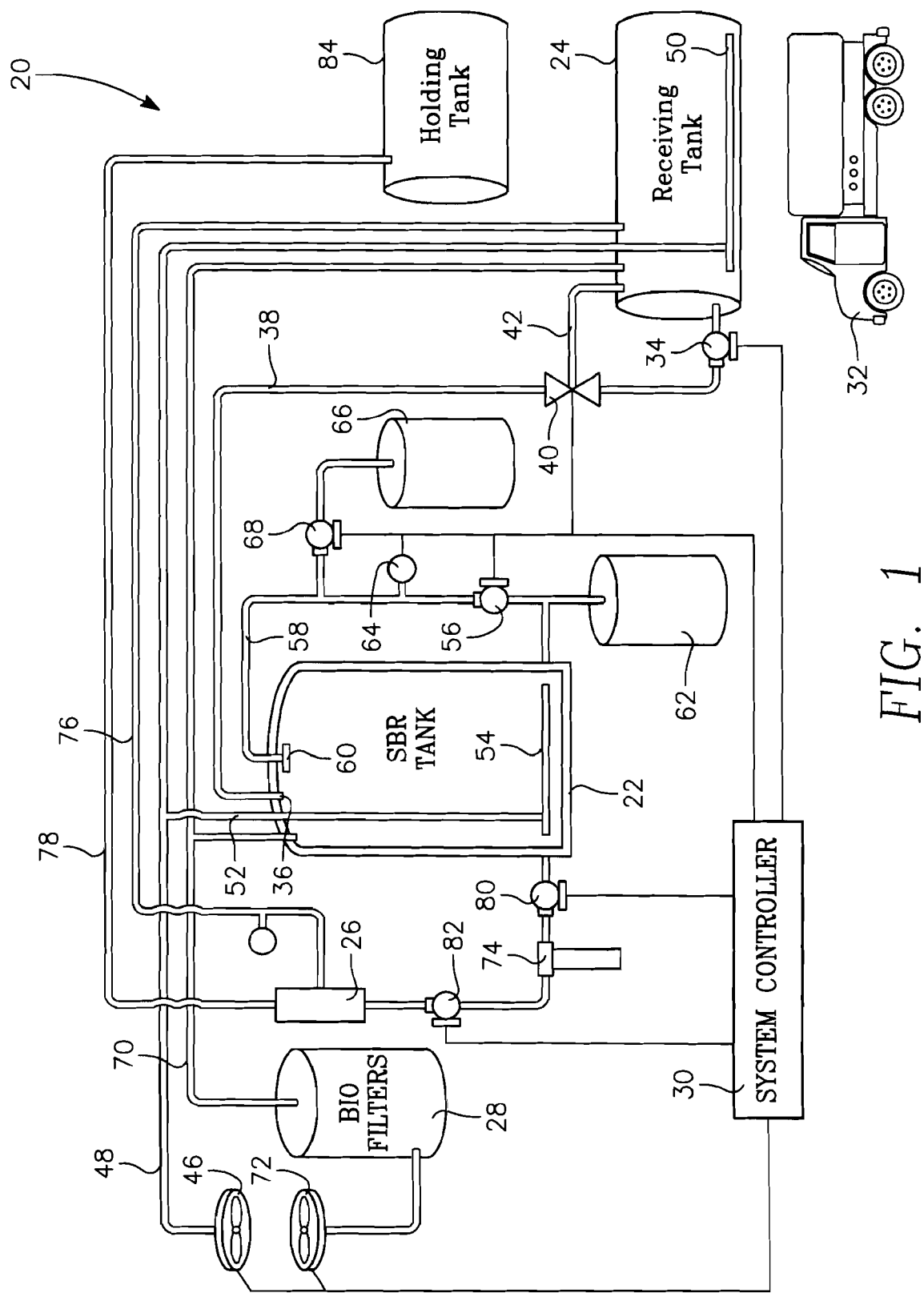
FIG. 1 is a schematic diagram of the bioreactor system for the biological degradation of oily sludge which comprises the present invention.

Referring to FIG. 1, FIG. 1 illustrates a schematic diagram of bioreactor system/installation 20 and its associated components. The major components are of the reactor installation are the sequencing batch reactor tank/bioreactor tank 22, a sludge receiving tank 24, an ultrafiltration unit 26, compost filled biofilters 28, and a controller/control room 30. The nature of the waste to be treated, and capacity of the tanks requires the bioreactor installation 20 to be installed on a concrete pad with secondary containment.

The raw material for treatment by bioreactor tank 22 is oily sludge. Sources at military facilities which provide the oily sludge include but are not limited to fuel tank bottoms, pump stations, wash racks, and oil/water separators. Oily sludge is delivered via a dedicated pipeline or vacuum trucks 32 to receiving tank 24, where the oily sludge is diluted and run through a trash pump 34 to produce a homogenous slurry. The discharge port of trash pump 34 is connected to the slurry inlet port 36 of reactor by a slurry pipe line 38.

The trash pump 34 transfers sludge under pressure from receiving tank 24 to the bioreactor tank 22. The trash pump 34 also recirculates sludge into the receiving tank 24. A three way valve 40 located in slurry pipe line 38 diverts sludge through a slurry recirculation pipe line 42 into receiving tank 24.

Receiving tank 24 is aerated to reduce the formation of hydrogen sulfide and other noxious reduced sulfur compounds, and to keep the contents of the processing tank from settling. Since the contents of the receiving tank 24 are aerated and recirculated, degradation of the oily sludge will occur within the receiving tank 24. A main blower/fan 46 supplies pressurized air through a main air supply line 48 to a bottom portion of the receiving tank 24. The bottom portion of the sludge receiving tank 24 includes a plurality of air nozzles 50 which provide pressurized air to receiving tank 24 causing the aeration process to occur within receiving tank 24.

Bioreactor tank 22 is a 10,000 gallon sequencing batch reactor. The bioreactor tank 22 has a working capacity of 9,000 gallons and a nominal design capacity of 15,000 to 20,000 gallons per month of diluted sludge, which corresponds to 3,000-4,000 gallons per month of raw sludge.

The bioreactor tank 22 is equipped with an aeration system. A branch air supply line 52 extends from the main air supply line 48 to the bottom portion of the bioreactor tank 22. The bottom portion of the bioreactor tank 22 includes a plurality of air nozzles 54 which provide pressurized air to bioreactor tank 22 causing the aeration process to occur within bioreactor tank 22.

A recirculation pump 56 is included in a recirculation line 58 which has its outlet end positioned vertically at the bottom of bioreactor tank 22 and its inlet end positioned at the top of bioreactor tank 22. Equipping the inlet end of recirculation line 58 with a spray head 60 controls foaming in the bioreactor tank 22. The inlet port of recirculation pump 56 is connected to a nutrient tank 62 so that a concentrated solution of inorganic and organic nutrients which includes nitrogen, phosphorus, and commercial products that provide amino acids and vitamins is pumped directly into the recirculation line 58.

The bioreactor tank 22 is also equipped with a thermocouple, level sensors and an alarm.

To neutralize carboxylic acids produced during initial degradation of the hydrocarbons and maintain a near neutral pH, a pH controller 64 is used to pump 50% sodium hydroxide into the recirculation line 58. The sodium hydroxide is stored in storage tank 66 connected to the recirculation line 58 and is supplied to the recirculation line 58 by a storage tank supply pump 68. The production of these intermediates, which are surfactants, is also responsible for foaming within the bioreactor tank 22. As the oily sludge compounds are degraded, foam formation decreases and the pH stabilizes at about 7.5.

Exhaust air from the reactor and receiving tank are passed through an air filtration system. As air moves through the compost in the biofilters 28, resident bacteria capture and degrade volatilized hydrocarbons, ammonia, and hydrogen sulfide. This technology was evaluated using a 75-liter reactor in preliminary studies conducted by the Naval Facilities Engineering Service Center at Port Hueneme, Calif. Compost filled biofilters are a technology that is used to control odors at sewage treatment plants and industries that emit biodegradable volatile organic compounds, e.g., paint spray booths.

The preferred embodiment includes compost filled biofilters such as a commercially available Biocube from Biocube LLC of Victor, N.Y.

An air exhaust line 70 transfers contaminated air from the bioreactor tank 22 and the receiving tank 24 to the biofilter 28. An exhaust blower/fan 72 withdraws contaminated air from the receiving tank 24 and the bioreactor tank 22 through air exhaust line 70 to biofilter 28.

Bioreactor installation 20 includes a recirculation line 76 which connects the ultrafiltration unit 26 to the receiving tank 24. A discharge line 78 includes a pair of pumps 80 and 82 with pump 80 being located within discharge line 78 between bioreactor tank 22 and bag filter 74 and pump being located within discharge line 78 between bag filter 82 and ultrafiltration unit 26.

At the end of a reaction cycle which is generally in a range of 5 to 10 days, the aeration system and recirculation pump 56 are turned off from the controller 30 and solids settle to the bottom of the bioreactor tank 22. After settling to the bottom of the bioreactor tank 22, supernatant and solids are passed through a bag filter 74 and ultrafiltration unit 26. Suspended solids which are primarily biomass are recycled to the receiving tank 24. The bag filter 74 which is upstream from the ultrafiltration module 26 removes larger particles which reduces fouling of the ultrafiltration membranes. Clean effluent from the ultrafiltration unit 26 is sent to a 20,000 gallon holding tank 84 and either discharged to the sewer or used as make-up water for incoming sludge.

At this time it should be noted that the bioreactor tank 22 includes a thermocouple, level sensor and alarm, as well as sampling ports.

TABLE 1

Sampling, Analyses, and Monitoring of the SBR Bioreactor

| Parameter | Oily Sludge | Ultrafiltrate Permeate | Ultrafiltrate Retentate | Method |
|---|---|---|---|---|
| Hydrocarbon | | Weekly Samples | | 8015M and 4030 |
| Total Suspended Solids (TSS) | | Weekly Samples | | Standard Method 2540 D |
| pH | | pH electrode for continuous monitoring | | Calibrated pH Electrode |
| Phosphate Nitrate and ammonia | | Weekly Samples | | Ion Chromatography Standard Method 4110 B |
| Metals | | Beginning and End | | Standard Method 3120 B ICP |
| Temperature | | Thermocouple for continuous monitoring | | Calibrated Thermocouple |

Biomass that accumulates in the bioreactor tank 22 may be disposed by adding it to compost piles. Accumulated biomass may also be disposed of at a permitted landfarm or captured in a filter press and land filled.

When composting is an option, the impact of residual biosolids on composting is evaluated by the ability of the compost piles to maintain composting temperature and decreases in fecal bacteria if biosolids from sewage treatment plants are part of the compost recipe. When the performance and analyses of reactor biomass amended compost piles is comparable to regular compost piles, then the piles are allowed to mature. When reactor biomass amended compost piles do not meet permit requirements, composting will either continue or the piles will be landfilled. When composting is not an option, biosolids are captured in a bag filter or filter press, analyzed, and disposed of in a conventional landfill.

The bioreactor tank 22 is capable of treating 3,000 to 4,000 gallons of raw oily sludge per month. To achieve the high bacterial densities that promote rapid biodegradation and eliminate the need for a clarifier, the bioreactor system 20 uses the ultrafiltration unit 26 to concentrate and recycle sludge degrading bacteria. This innovative use of an ultrafiltration unit 26 allows a 3 to 4 fold reduction in the size of the system 20. The liquid stream (permeate) that passes through the ultrafiltration unit 26 is a dilute solution of salts and nutrients that is either discharged to the sewer or used to dilute incoming oily sludge prior to charging the bioreactor tank 22.

This unique approach eliminates the need for land filling and results in complete degradation of hydrocarbons and other organic components in the sludge, leaving only process water and biomass as non-toxic byproducts. The cost of biological treatment is $0.08/lb, which includes operation and maintenance, and equipment depreciation. In contrast, shipping oily sludge from Hawaii to the mainland costs an average of $0.76/lb and the Navy remains liable for landfilled sludge. Thus, biological treatment results in a cost savings of 90% and eliminates liability.

The steps required for the degradation of oily sludge process are set forth as follows. Oily sludge is delivered to receiving tank 24 where it is diluted with permeate from the ultrafiltration unit 26, city water or a combination of the two. In addition, reject from the ultrafiltration unit 24, which is mostly biomass, is discharged to the receiving tank 24. During operation of the ultrafiltration unit 26, discharging to the receiving tank 24 rather than the bioreactor tank 22 minimizes resuspension of settled solids in the bioreactor tank 22 and fouling of the bag filter 74 and ultrafiltration unit 26. Since the receiving tank 24 is aerated and the contents recirculated, some degradation occurs in the receiving tank 24. The trash pump 34 transfers sludge to the bioreactor tank 22 where it is diluted to a final working concentration of 20,000 ppm. Each cycle of the process requires about 30 pounds of ammonium phosphate fertilizer, 7 pounds of yeast extract, and 4 pounds of casamino acids. A standard pH controller 65 maintains a pH of 7 to 7.5 by injecting 50% sodium hydroxide from tank 66 through pump 68 into the recirculation line 58.

Currently, a degradation cycle requires 5 days, at which time the aeration system and recirculation pump 56 are turned off and the solids allowed to settle for 4-6 hours. As originally installed, the ultrafiltration unit 26 required approximately 16 hours to process the contents of the bioreactor tank 22. Since this data was collected, the original tubular membranes within ultrafiltration unit 26 have been replaced with higher capacity spiral wound membranes which halved the processing time. The system is set to leave 1,500 gallons of liquid (mostly biomass) in the bottom of the bioreactor tanks 24 that serves as seed for the next batch of oily sludge. Since the system 20 is automated, the ultrafiltration unit 26 runs overnight and the following morning the bioreactor tank 24 is charged with the next batch of oily sludge.

Either manual or automatic operation of system 20 is possible through the system controller 30 which all pumps, blowers, valves and sensors are connected to and interfaced with. The controller 30 is accessed through a touch screen which allows the operator to view tank levels, pH, and the status of all pumps and valves. In auto mode, the operator enters the number of days that the reactor will run, the amount of sludge to be transferred from the receiving tank 24, the dilution factor, and the settling time. When the tank has settled, the ultrafiltration unit 26 comes on line and processes the contents of the bioreactor tank 22. The system 20 can also transfer sludge automatically from the receiving tank 24 to the bioreactor tanks 22 and dilute it to a predetermined value entered by the operator. When sludge is delivered to the receiving tank 24, the operator enters the volume of sludge to be transferred and any dilution factor and the controller's processor ensures that the entered values do not exceed tank capacity.

Operational testing of system 20 was accomplished in the following manner. After verifying the integrity of the plumbing, valves and pumps 34, 56, 68, 80 and 82, and proper operation of the blowers 46 and 72 and controller 30, the bioreactor tank 22 was charged with oily sludge. The sludge was selected because it is dilute, approximately 1,500 ppm hydrocarbons, and in testing was shown to harbor a diverse population of hydrocarbon degrading bacteria. The goal during startup was to avoid overloading the system 20 which could have inhibited bacterial growth. The first load of sludge was degraded within 10 days. To establish a more than adequate bacterial population the process was repeated three times. Subsequently the bioreactor tanks 20 was charged with emulsified oil, sludge, and oily sludge. Approximately 30,000 gallons of oily sludge were successfully processed.

Figure 3:
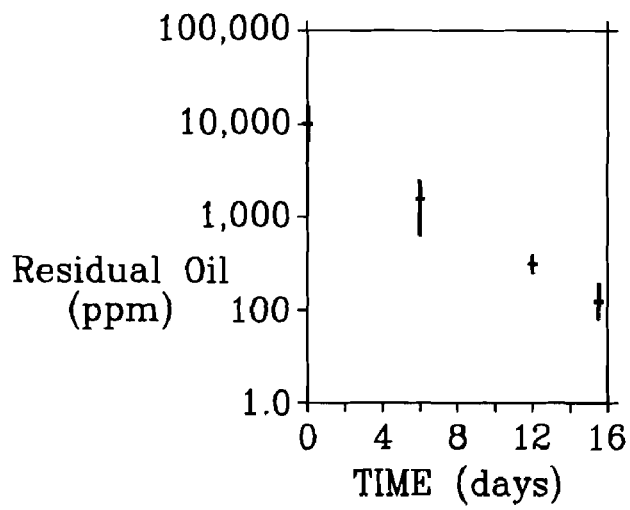
FIG. 3 illustrates a hydrocarbon degradation plot for the sequencing batch reactor tank of FIG. 1 when processing oily sludge.
Figure 4:
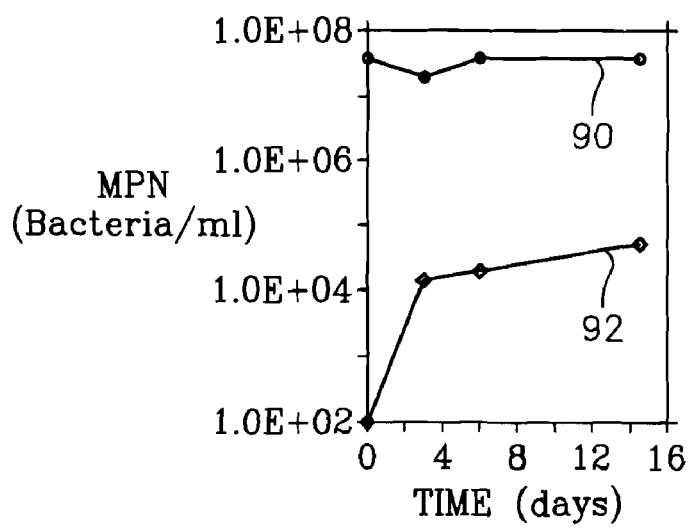
FIG. 4 illustrates bacterial growth plots for the sequencing batch reactor tank of FIG. 1 when processing oily sludge.
Figure 5:
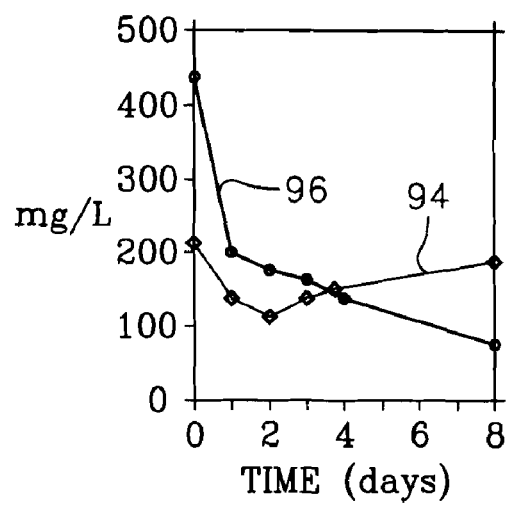
FIG. 5 are plots which depict the consumption of Ammonia and Phosphorous during hydrocarbon degradation in the reactor tank of FIG. 1.

Initially the bioreactor tank 22 was charged with oily sludge. At regular intervals samples were taken and analyzed for residual hydrocarbons, total bacteria, and hydrocarbon degrading bacteria, as shown in FIGS. 3 and 4, respectively. Hydrocarbon concentrations are the average of three separate samples. Plot 90 depicts MPN Heterotrophs and plot 92 depicts MPN HC Degraders.

Data gathered during testing shows a rapid outgrowth of hydrocarbon degrading bacteria selected from a large population of heterotrophs that are found in oily sludge. Outgrowth of the hydrocarbon degrading bacteria correlates with the degradation of the hydrocarbons in the oily sludge and the consumption of nitrogen (plot 94) and phosphorous (plot 96) are shown in the plots 94 and 96 of FIG. 6. After 10 days, the air and recirculation systems were turned off and the reactor was allowed to settle and supernatant run through the ultrafiltration unit 26. No hydrocarbons were detected in the permeate which was stored in tank 84 and used to dilute incoming sludge. Recycling of the bacteria has resulted in a bacterial population that now degrades sludge hydrocarbons in approximately 5 days. The concentration of hydrocarbons in the sludge that accumulated in the bioreactor tank 22 after several months of operational testing was less than 500 ppm which is well within the allowable concentration for disposal at a landfarm. Since natural products artificially inflate the hydrocarbon concentration, the actual concentration of hydrocarbons derived from the oily sludge is considerably less than 500 ppm.

As shown in FIGS. 6 and 7, supernatant and solids that accumulate in the bioreactor tank 22 were analyzed for priority metals, copper 100, nickel 102 and zinc 104. Copper, nickel, and zinc are the predominant metals, which is consistent with the origins of the sludge. Metals adsorption to bacterial cells and precipitation as oxyhydroxides accounts for the time dependent increase in metals concentration in the solids fraction as shown in FIG. 7. In the liquid phase lead 106, chromium 108 and cadmium 110 were not detected.

Although there was a six-fold decrease in solids when oily sludge is digested in the bioreactor tank 22, approximately 200 grams of biomass accumulate in the 75 Liter reactor during each run. The biological oxygen demand of accumulated biomass can impact performance of the bioreactor tank 22 and also impact performance of the bag filter 74 and ultrafilter 26. This material may be composted or the tank bottoms may be hauled to a landfarm.

Oily sludge was suspended in water, stirred, aerated, and duplicate air samples were collected in Tedlar® bags and analyzed for priority pollutants. Since the purpose of testing was to estimate the maximum potential release of priority pollutants, degradation was minimized. Specifically, no nutrients were added, biologically active sludge was not included, and samples were collected after 2 hours. Table 2, below, shows the priority pollutants (BTEX) that were detected and their concentrations.

TABLE 2

Emission of Priority Pollutants from Oily Waste

| Pollutant | Concentration ppm v/v Average ±SD |
|---|---|
| Benzene | 0.044 ± 0.021 |
| Toluene | 0.28 ± 0.45 |
| Ethylbenzene | 0.85 ± 0.3 |
| Xylenes | 2.77 ± 0.95 |

Samples were also analyzed for priority pollutants containing reduced sulfur with the results being depicted in Table 3. The results suggest as shown in Table 3 suggest that reduced sulfur compounds may be present, but at concentrations less than a minimum detection level. Since these reduced sulfur compounds are rapidly oxidized, the results are what would be expected in a well-aerated system. When fresh oily sludge is added to either a 75 liter or 10,000 gallon reactor, there is a substantial and transient increase in oxygen consumption over a time period of approximately two hours. While some fraction of this activity is due to biological activity, rapid oxidation of reduced sulfur compounds also consumes substantial amounts of oxygen.

TABLE 3

Emission of Sulfur Containing Priority Pollutants from Oily Waste

| Pollutant | Result[a] | Minimum Detection Level ppm (v/v) |
|---|---|---|
| Hydrogen Sulfide | BDL | 0.5 |
| Carbonyl Sulfide | BDL | 0.5 |
| Methyl Mercaptan | BDL | 0.5 |
| Ethyl Mercaptan | BDL | 0.5 |
| Carbon disulfide | BDL | 0.5 |
| Dimethyl Sulfide | BDL | 0.5 |
| Total Sulfur | BDL | 1.0 |

[a]BDL—Below Detection Level

Average concentrations in Table 2, were used to calculate the maximum potential emission of these compounds from the SBR. These calculations assume that no degradation occurs. However, the compounds in Table 2 are some of the most readily degraded hydrocarbons and have not been observed in a 75 liter pilot scale reactor or the 10,000 gallon reactor. Furthermore, these concentrations may not be representative of all sources of oily sludge. Emission calculations used the full scale reactor design air flow of 100 cubic feet per minute (cfm) and assumed that the compounds were volatilized at constant concentration for eight hours. Given the volatility of the priority pollutants, this is not an unreasonable assumption. Emissions were calculated assuming that the reactor is charged with 1000 gallons which is approximately 8000 pounds of fresh sludge twice a month. This equates to 24 runs per year. The results of the calculations are summarized in Table 4 in the manner shown below.

TABLE 4

Concentrations of Priority Pollutants Discharged to the Air during the Biological Treatment of Oily Waste

| Pollutant | Quantity Pounds/Run | Quantity Tons/Year |
|---|---|---|
| Benzene | 1.17 | 0.014 |
| Toluene | 0.875 | 0.01 |
| Ethylbenzene | 30.8 | 0.37 |
| Xylenes | 100.4 | 1.2 |
| Total | 133.2 | 1.6 |

The calculations for Table 4 assumed that no degradation occurs in the reactor.

Even though the concentrations of sulfur containing priority pollutants were below the detection level, potential emissions of these compounds, which are illustrated in Table 5, were calculated using the same assumptions. To make these calculations, concentrations of the individual compounds were assumed to equal one-half the minimum detection level as shown in Table 3. Even though these compounds are rapidly oxidized and readily degraded, it was assumed that no degradation occurred.

TABLE 5

Concentrations of Sulfur Containing Priority Pollutants Discharged to the Air During the Biological Treatment of Oily Waste

| Pollutant | Quantity Pounds/Run | Quantity Tons/Year |
| --- | --- | --- |
| Hydrogen Sulfide | 2.9 | 0.0345 |
| Carbonyl Sulfide | 5.1 | 0.0615 |
| Methyl Mercaptan | 4.1 | 0.0495 |
| Ethyl Mercaptan | 5.3 | 0.0635 |
| Carbon disulfide | 6.4 | 0.0775 |
| Dimethyl Sulfide | 5.3 | 0.0635 |
| Total | 29.1 | 0.3500 |

The calculations in Table 5 assume that no degradation occurs in the bioreactor tanks 22. To minimize and virtually eliminate the emission of priority pollutants, exhaust air from the bioreactor tank 22 is passed through compost filled biofilters 28. The design capacity of each biofilter 28 is 150 cfm. Since the design air flow of the bioreactor tank 22 is 100 cfm, the combined capacity of the biofilters is approximately 80% greater than the maximum air flow through bioreactor tanks 22.

Referring to FIGS. 2A-2D, to ensure adequate residence time, the biofilters 28 are arranged so that the incoming air is split between two biofilters 120 and 122 and the exhaust air from the biofilters 120 and 122 is fed to a third biofilter 124. A separate fan 72 is used to maintain a slight negative pressure in the exhaust air line system that serves the bioreactor tank 22 and receiving tank 24. The exhaust air line system includes the main exhaust air line 130 and branch exhaust air line 132. Exhaust air line 130 connects the biofilters 120, 122 and 124 and fan 72 to the receiving tank 24. Branch exhaust air line 132 connects the bioreactor tank 22 to the main exhaust air line 130.

Biofilters 120, 122 and 124 routinely remove more than 90% of BTEX from contaminated air. Thus, the yearly emissions of these compounds from the bioreactor tank 22 is expected to be less than 0.16 ton or about 320 pounds per year. When biodegradation in the bioreactor tanks 22 (measured >99.5%) is included, total yearly emissions of BTEX are predicted to be less than 16 pounds per year. Actual measurements of priority air pollutants in the exhaust air prior to and after leaving the biofilters 120, 122 and 124 are in progress.

Figure 2A:
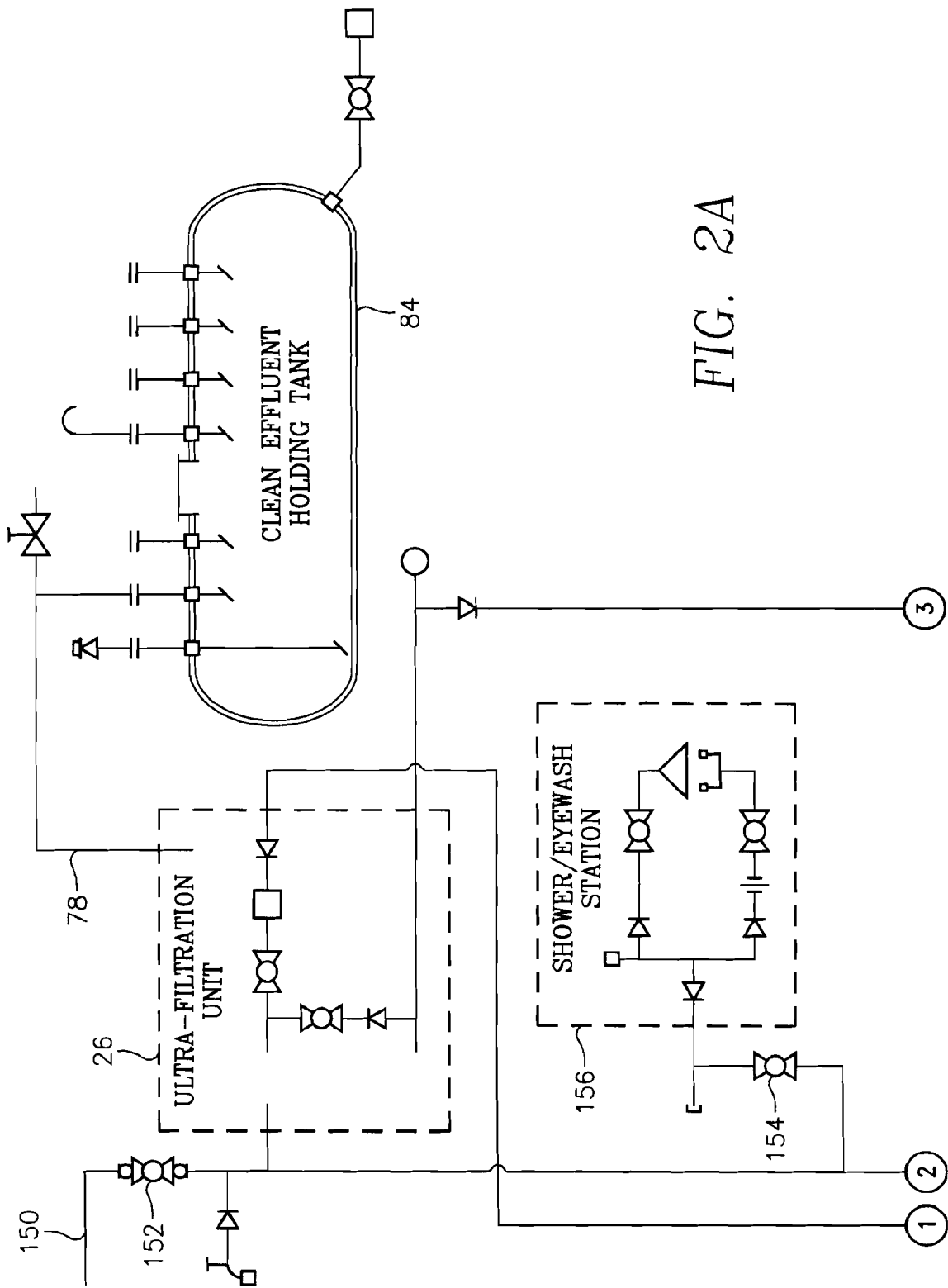
FIGS. 2A-2D depict a detailed schematic diagram of the bioreactor of FIG. 1.
Figure 2B:
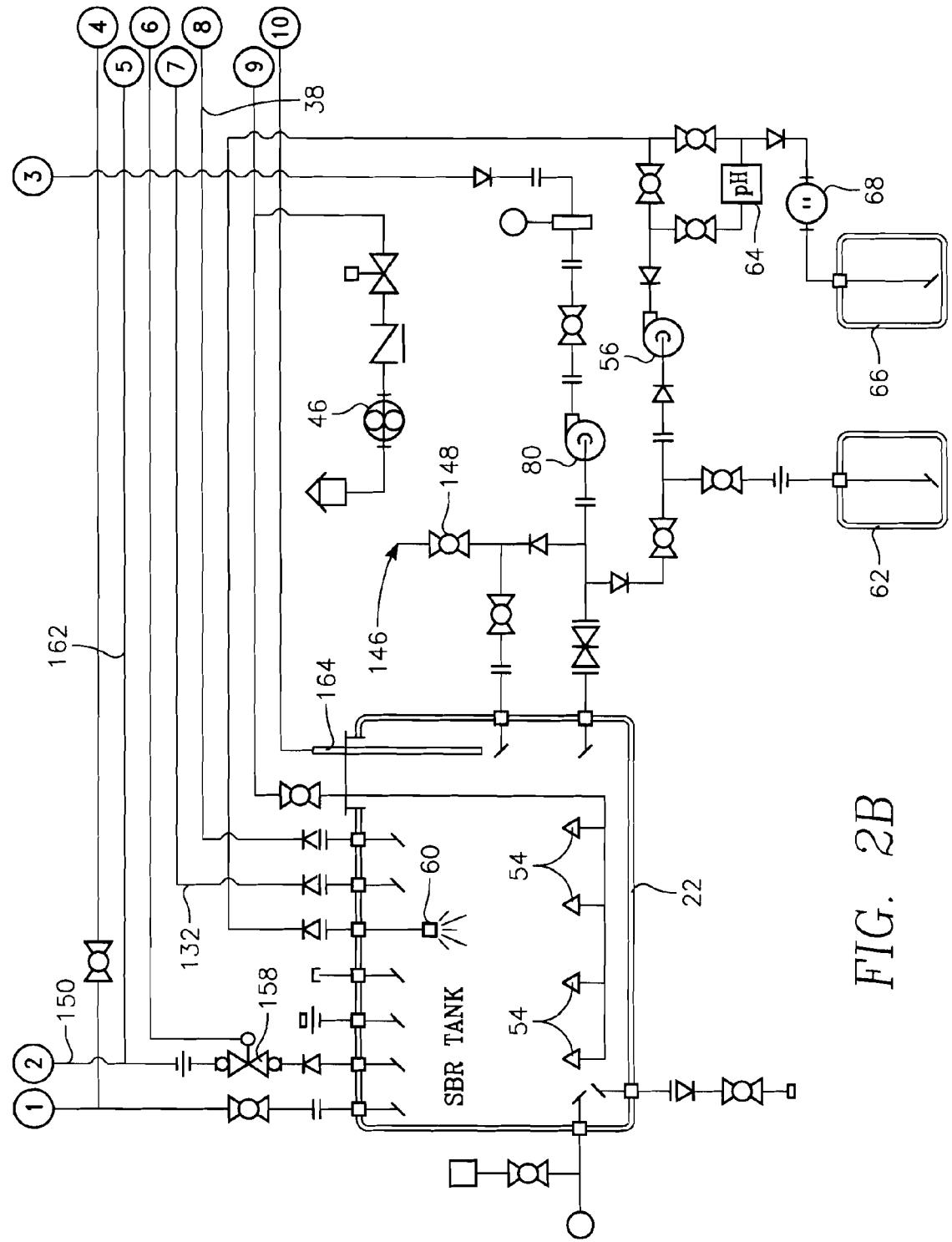
Figure 2C:
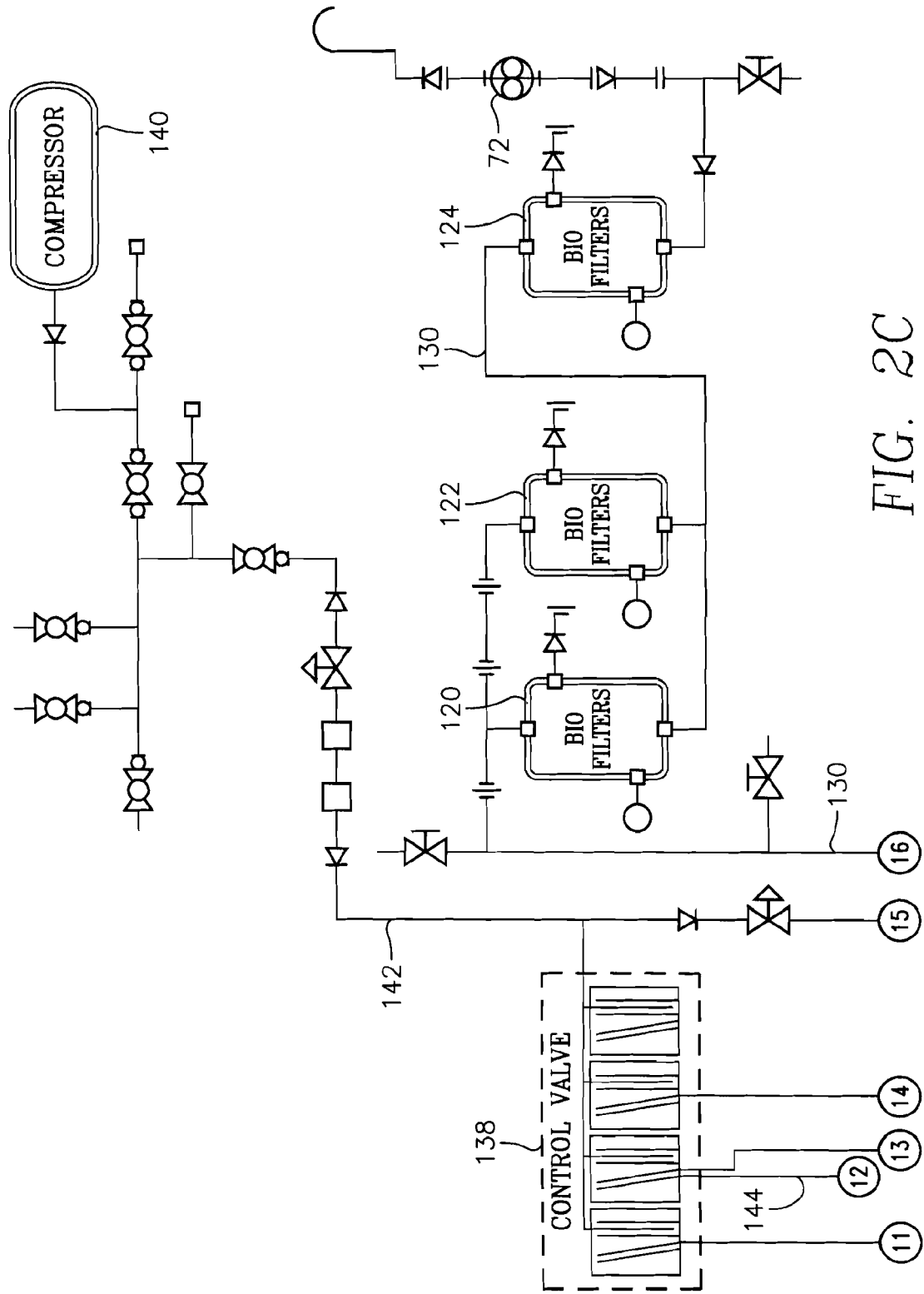
Figure 2D:
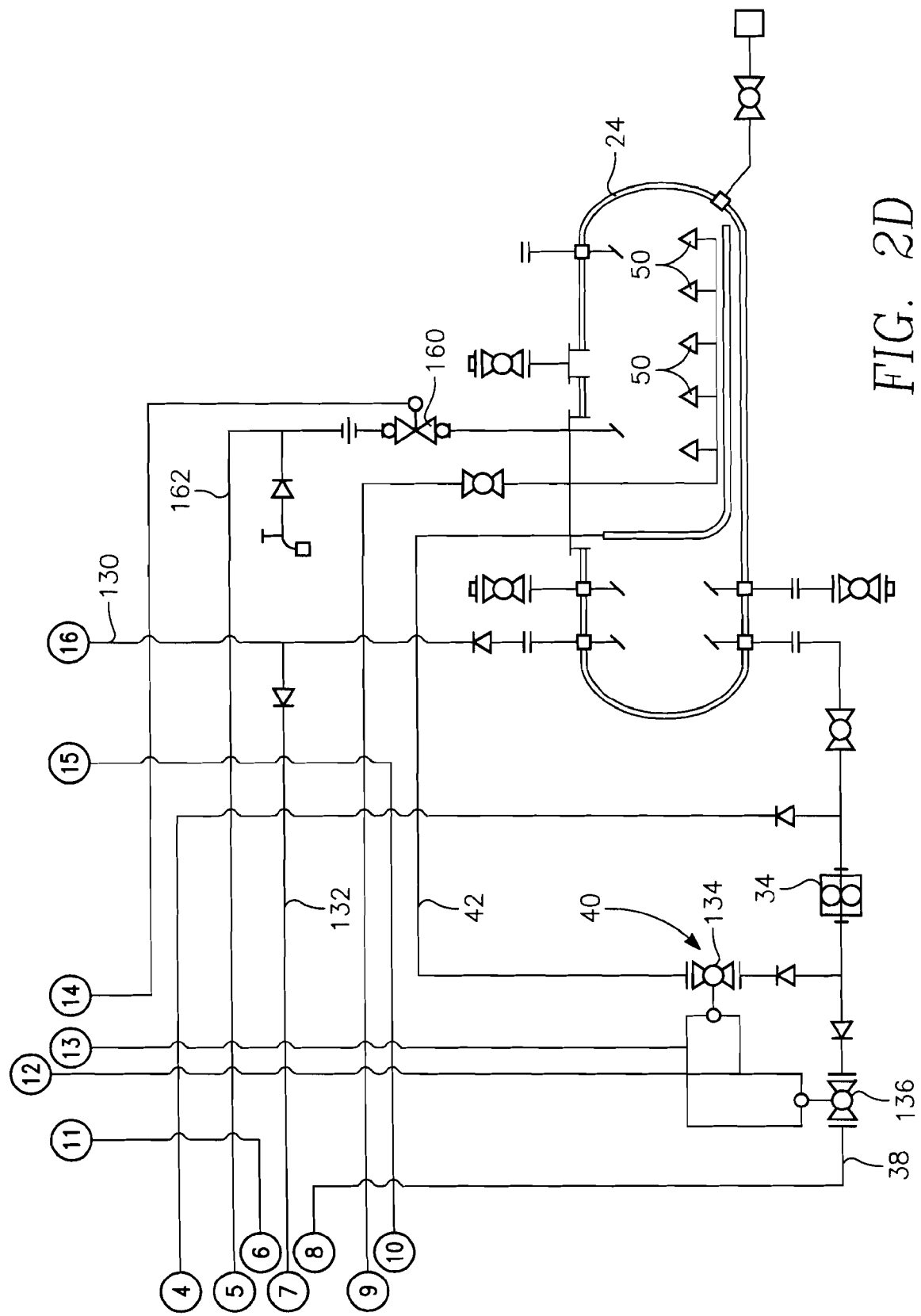

As shown in FIG. 2D, the three way valve 40 includes a pair of fluid operated valves 134 and 136 which are connected to a control valve 138. When valve 134 is open, oily sludge is diverted through a slurry recirculation pipe line 42 into receiving tank 24. When valve 136 is open flow of oily sludge is through slurry pipe line 38 to bioreactor tank 22. Control valve 138 receives a compressed fluid from a compressor 140 via a fluid supply line 142 and diverts the compressed through a ⅜ inch OD pipe 144 to open either valve 134 or valve 136.

Bioreactor tank 22 is equipped with a sampling port 146 which may be accessed by opening valve 148. There is also a water line 150 which allows a user to connect bioreactor system/installation 20 to an external water source such as a city water source. When valves 152 and 154 are open fresh water is supplied to a shower/eye wash station 156. When a fluid operated valve 158 is open fresh water is supplied to bioreactor tank 22. Opening a fluid operated valve 160 supplies fresh water through a branch water supply line 162 to sludge receiving tank 24. Fluid operated valves 158 and 160 are connected to control valve 138 which is used to open and close fluid operated valves 158 and 160.

The bioreactor tank 22 also has a dissolved oxygen probe 164 which extends to the midpoint of the bioreactor tank 22.

Samples of raw and treated sludge have been assayed for toxicity using fathead minnows and Microtox®. While raw sludge was toxic in both assays, treated sludge was not toxic in either assay.

A summary of the results of treating oily sludge using the preferred embodiment illustrated in FIG. 1 are as follows:

Navy research concluded that bacteria already present in and adapted to oily sludge from a variety of sources degrade the hydrocarbons found in oily sludge within two weeks from 20,000 ppm to less than 100 ppm. In addition, the concentrations of heavy metals (primarily zinc and copper) and total suspended solids in treated sludge residuals remain well below discharge limits.

Currently, a degradation cycle for bioreactor system/installation 20 requires 5 days. The recirculation pump 56 is turned off and the solids are allowed to settle in bioreactor tank 22. The ultrafiltration unit 26 requires approximately 16 hours to process the contents of the bioreactor tank 22.

The concentration of hydrocarbons in the sludge in the reactor after testing for a substantial time period was less than 500 ppm. That is well within the allowable concentration for disposal at the landfarm.

Copper, nickel, and zinc are the predominant metals that accumulate in the bioreactor tank 22 at non-hazardous levels, which is consistent with the origins of the oily sludge. Lead, chromium, and cadmium were not detected in the liquid phase.

To minimize and virtually eliminate the emission of priority pollutants including Benzene, Toluene, Ethylbenzene, Xylenes (BTEX), exhaust air from the bioreactor tank 22 is passed through compost filled biofilters 120, 122 and 124. Biofilters 120, 122 and 124 routinely remove more than 90% of BTEX from contaminated air. When biodegradation in the bioreactor tank 22 (measured >99.5%) is included, total yearly emissions of BTEX will likely be less than 16 pounds per year.

Samples of raw and treated sludge were assayed for toxicity. While raw sludge was toxic in both assays, treated sludge was not toxic in either assay. These results demonstrate that on-site biological treatment is technically sound and economically justified and that a sequencing batch reactor 20, FIG. 1, is easily assembled on site using off-the-shelf components and surplus tanks. This approach eliminates the sludge, normally shipped to a landfill, at significant cost savings (disposal costs are reduced from $0.76/lb to $0.08/lb) which for most installations would be recovered in 2 years. Long-term liability associated with landfilling oily sludge is also eliminated.

At this time it should be noted that the bioreactor system/installation 20 and its associated components can be used treat other oily waste such as used hydraulic oil, contaminated diesel fuel, lube oils, solvent based paints and water based paints.

From the foregoing, it is readily apparent that the present invention comprises a new, unique and exceedingly useful bioreactor system for the biological degradation of oily sludge. which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. An apparatus for the biological degradation of oily waste comprising:
  (a) a receiving tank for receiving said oily waste and then diluting said oily waste with water to produce a homogenous slurry, said receiving tank having an outlet port;
  (b) a trash pump having an inlet port connected to the outlet port of said receiving tank and a discharge port;
  (c) a three way valve having an inlet port connected to the discharge port of said trash pump, a first outlet port and a second outlet port;
  (d) a sequencing batch reactor tank connected to the first outlet port of said three way valve to receive said homogeneous slurry from said receiving tank, said trash pump transferring said homogeneous slurry from said receiving tank through said three way valve to said sequencing batch reactor tank when said trash pump is activated and said three way valve is set to a first fluid flow position to pass fluids from said inlet port of said three way valve to said first outlet port of said three way valve, said sequencing batch reactor tank comprising a bioreactor tank having a capacity of 10,000 gallons, wherein said sequencing batch reactor tank has a working capacity of 9,000 gallons and a nominal design capacity of 15,000 to 20,000 gallons per month of diluted sludge, which corresponds to a treatment capacity of 3,000-4,000 gallons per month of raw sludge;
  (e) a first recirculation line having one end connected to a first outlet port located at the bottom of said sequencing batch reactor tank and an opposite end extending inward into an upper portion of said sequencing batch reactor tank;
  (f) a recirculation pump located within said first recirculation line for circulating said homogeneous slurry through said first recirculation line and said sequencing batch reactor tank for a reaction cycle time period when said recirculation pump is activated;
  (g) a nutrient tank connected to said first recirculation line upstream from said recirculation pump, said nutrient tank supplying a concentrated solution of nutrients to said homogeneous slurry as said homogeneous slurry flows through said first recirculation line wherein said concentrated solution of nutrients provide amino acids and vitamins to said homogeneous slurry;
  (h) a pH controller coupled to said first recirculation line to monitor said homogeneous slurry flowing through said first recirculation line;
  (i) a storage tank supply pump having an inlet port and a discharge port connected to said first recirculation line;
  (j) a storage tank connected to the inlet port of said storage tank supply pump, said storage tank containing a solution of fifty percent sodium hydroxide, said storage tank supply pump when activated transferring said solution of fifty percent sodium hydroxide to said first recirculation line to neutralize carboxylic acids produced during initial degradation of hydrocarbons within said homogeneous slurry and maintain an approximately neutral pH;
  (k) said ph controller being connected to said storage tank supply pump, said pH controller being used to activate and deactivate said storage tank supply pump wherein an activation of said storage tank supply pump transfers said solution of fifty percent sodium hydroxide to said first recirculation line to neutralize carboxylic acids within said homogeneous slurry and maintain said approximately neutral pH;
  (l) said recirculation pump being deactivated to allow supernatant and solid waste within said sequencing batch reactor tank to settle to the bottom of said sequencing batch reactor tank;
  (m) a discharge line having one end connected to a second outlet port located at the bottom of said sequencing batch reactor tank, said discharge line including a first discharge pump and a second discharge pump;
  (n) an ultrafiltration unit located within said discharge line downstream from said second discharge pump, wherein said ultrafiltration unit has ultrafiltration membranes;
  (o) a bag filter located within said discharge line upstream from said ultrafiltration unit and downstream from said first discharge pump, said bag filter removing substantially larger particles of said supernatant and solid waste withdrawn from said sequencing batch reactor tank which reduces fouling of the ultrafiltration membranes of said ultrafiltration unit, wherein said first discharge pump when activated transfers said supernatant and solid waste from said sequencing batch reactor tank through said discharge line to said bag filter and said second discharge pump transfers said supernatant and solid waste from said bag filter through said discharge line to said ultrafiltration unit;
  (p) said ultrafiltration unit removing substantially smaller suspended particles of said supernatant and solid waste withdrawn from said sequencing batch reactor tank, said ultrafiltration unit discharging a clean effluent having less than 100 ppm of said hydrocarbons;
  (q) a plurality of biofilters connected to the upper portion of said sequencing batch reactor tank and said receiving tank, each of said plurality of biofilters having compost contained therein;
  (r) an exhaust blower connected to said plurality of biofilters, said exhaust blower withdrawing contaminated air from said receiving tank and said sequencing batch reactor tank to said plurality of biofilters wherein said contaminated air passes through said plurality of biofilters such that the compost in each of said plurality of biofilters captures and degrades volatilized hydrocarbons, ammonia, and hydrogen sulfide within said contaminated air;
  (s) a first aeration system disposed in a bottom portion of said sequencing batch reactor tank, said first aeration system having a plurality of air nozzles which provide pressurized air to said sequencing batch reactor tank to aerate said homogeneous slurry as said homogeneous slurry circulates through said sequencing batch reactor tank, said first aeration system being active for said reaction cycle time period and turned off at a conclusion of said reaction cycle time period;
  (t) a main blower connected to said first aeration system, said main blower supplying said pressurized air to said first aeration system;
  (u) a second recirculation line having one end connected to the second outlet port of said three way valve and an opposite end extending vertically downward into said receiving tank, said trash pump circulating said homogeneous slurry through said second recirculation line and said receiving tank when said trash pump is activated and said three way valve is set to a second fluid flow position to pass fluids from said inlet port of said three way valve to said second outlet port of said three way valve;
(v) a second aeration system disposed in a bottom portion of said receiving tank, said second aeration system having a plurality of air nozzles connected to said main blower to provide said pressurized air from said main blower to said receiving tank to aerate said homogeneous slurry within said receiving tank;
(w) a holding tank connected to an opposite end of said discharge line wherein said holding tank receives and stores therein said clean effluent from said ultrafiltration unit;
(x) a system controller connected to said trash pump, said recirculation pump, and said first and second discharge pumps to selectively activate and deactivate said trash pump, said recirculation pump, said first discharge pump and said second discharge pump, said system controller providing for a manual mode of operation and an automatic mode of operation for said apparatus for the biological degradation of said oily waste;
(y) said system controller being connected to said three way valve, wherein said system controller controls said three way valve setting said three way valve to provide for a fluid flow of said homogenous slurry from said receiving tank to said sequencing batch reactor tank or setting said three way valve to provide for said fluid flow of said homogenous slurry from said receiving tank through said second recirculation line to said second aeration system disposed in a bottom portion of said receiving tank; and
(z) said system controller being connected to said pH controller and said storage tank supply pump, said system controller coordinating with said pH controller an activation and deactivation of said storage tank supply pump to insure timely transfers of said solution of fifty percent sodium hydroxide to said first recirculation line to neutralize said carboxylic acids within said homogeneous slurry and maintain said approximately neutral pH.

2. The apparatus of claim 1 wherein said concentrated solution of nutrients includes nitrogen, phosphorus, and commercial products that provide said amino acids and vitamins to said homogeneous slurry.

3. The apparatus of claim 2 wherein naturally occurring bacteria within said oily waste degrade said hydrocarbons in said homogeneous slurry while said homogeneous slurry is circulating through said sequencing batch reactor tank, said concentrated solution of nutrients providing growth for said naturally occurring bacteria.

4. The apparatus of claim 1 wherein said sequencing batch reactor tank is adapted to treat said oily waste including oily sludge, hydraulic oil, contaminated diesel fuel, lube oils, solvent based paints and water based paints.

5. The apparatus of claim 1 wherein said reaction cycle time period is in a range of about five to ten days.

6. The apparatus of claim 1 wherein whenever said apparatus is operating in said automatic mode of operation and said system controller is controlling the operation of said apparatus, an operator enters into said system controller a number for the days that said apparatus will run to biological degrade said oily waste, a volume of said oily waste for transfer from said receiving tank through said three way valve to said sequencing batch reactor tank, a dilution factor for diluting said oily waste with a permeate or water, and a settling time for said supernatant and solid waste within said oily waste to settle to the bottom of said sequencing batch reactor tank.

7. The apparatus of claim 1 wherein said holding tank comprises a fluid storage tank that stores approximately 20,000 gallons of said clean effluent discharged from said ultrafiltration unit.

8. The apparatus of claim 1 further comprising a spray head connected to the opposite end of said first recirculation line, said spray head being located in the upper portion of said sequencing batch reactor tank for controlling foaming of said homogeneous slurry within sequencing batch reactor tank.

9. A method for the biological degradation of oily waste comprising the steps of:
(a) providing a receiving tank to receive said oily sludge, wherein said receiving tank has an outlet port;
(b) diluting said oily waste with water in said receiving tank to produce a homogeneous slurry;
(c) transferring said homogeneous slurry from said receiving tank to a sequencing batch reactor tank, said sequencing batch reactor tank being adapted to treat said oily waste including oily sludge, hydraulic oil, contaminated diesel fuel, lube oils, solvent based paints and water based paints, wherein said sequencing batch reactor tank has a working capacity of 9,000 gallons and a nominal design capacity of 15,000 to 20,000 gallons per month of diluted sludge, which corresponds to a treatment capacity of 3,000-4,000 gallons per month of raw sludge;
(d) providing a trash pump having an inlet port connected to the outlet port of said receiving tank and a discharge port, said trash pump transferring said homogeneous slurry from said receiving tank to said sequencing batch reactor tank;
(e) providing a first recirculation line having one end connected to a first outlet port located at a bottom end of said sequencing batch reactor tank and an opposite end extending inward into an upper portion of said sequencing batch reactor tank;
(f) circulating said homogeneous slurry through said first recirculation line and said sequencing batch reactor tank for a reaction cycle time period;
(g) activating a recirculation pump located within said first recirculation line to circulate said homogeneous slurry through said first recirculation line and said sequencing batch reactor tank for said reaction cycle time period;
(h) providing a concentrated solution of nutrients to said homogeneous slurry as said homogeneous slurry flows through said first recirculation line to supply organic and inorganic nutrients to said homogeneous slurry, wherein said concentrated solution of nutrients is stored within a nutrient tank connected to said first recirculation line and pumped into said first recirculation line by activating said recirculation pump;
(i) providing a pH controller coupled to said first recirculation line to monitor a pH level for said homogeneous slurry flowing through said first recirculation line;
(j) providing a storage tank containing a solution of approximately fifty percent sodium hydroxide and a storage tank supply pump having an inlet port connected to said storage tank and a discharge port connected to said first recirculation line;
(k) activating said storage tank supply pump to transfer said solution of fifty percent sodium hydroxide to said first recirculation line to neutralize carboxylic acids produced during initial degradation of hydrocarbons within said homogeneous slurry and maintain an approximately neutral pH of 7.0 to 7.5, said pH controller activating said storage tank supply pump to transfer said solution of fifty percent sodium hydroxide to said first recirculation line to maintain said approximately neutral pH of 7.0 to 7.5;

(l) providing a discharge line which includes a first discharge pump and a second discharge pump located within said discharge line, wherein one end of said discharge line is connected to a second outlet port located at the bottom end of said sequencing batch reactor tank;

(m) deactivating said recirculation pump to allow supernatant and solid waste within said homogeneous slurry to settle to the bottom end of said sequencing batch reactor tank;

(n) providing an ultrafiltration unit located within said discharge line, said ultrafiltration unit having ultrafiltration membranes;

(o) providing a bag filter located within said discharge line upstream from said ultrafiltration unit;

(p) activating said first discharge pump to withdraw said supernatant and solid waste from said sequencing batch reactor tank and transfer said supernatant and solid waste from said sequencing batch reactor tank through said discharge line to said bag filter;

(q) removing substantially larger particles of said supernatant and solid waste withdrawn from said sequencing batch reactor tank which reduces fouling of the ultrafiltration membranes of said ultrafiltration unit wherein said bag filter removes said substantially larger particles of said supernatant and solid waste withdrawn from said sequencing batch reactor tank;

(r) activating said second discharge pump to withdraw said supernatant and solid waste from said bag filter after said bag filter removes said substantially larger particles of said supernatant and solid waste withdrawn from said sequencing batch reactor tank, said second discharge pump when activated transferring said supernatant and solid waste from said bag filter through said discharge line to said ultrafiltration unit;

(s) removing substantially smaller suspended particles of said supernatant and solid waste withdrawn from said sequencing batch reactor tank, wherein said ultrafiltration unit removes said substantially smaller suspended particles of said supernatant and solid waste withdrawn from said sequencing batch reactor tank; and (t) discharging a clean effluent from said ultrafiltration unit having less than 100 ppm of said hydrocarbons;

(u) providing a large capacity holding tank connected to the opposite end of said discharge line wherein said large capacity holding tank receives said clean effluent discharged from said ultrafiltration unit, and said large capacity holding tank has a storage capacity of about 20,000 gallons of said clean effluent;

(v) providing a plurality of biofilters connected to the upper portion of said sequencing batch reactor tank and said receiving tank, each of said plurality of biofilters having compost contained therein;

(w) withdrawing contaminated air from said receiving tank and said sequencing batch reactor tank and transferring said contaminated air to said plurality of biofilters;

(x) passing said contaminated air through said plurality of biofilters wherein the compost in each of said plurality of biofilters captures and degrades volatilized hydrocarbons, ammonia, and hydrogen sulfide within said contaminated air;

(y) aerating said homogeneous slurry as said homogeneous slurry circulates through said sequencing batch reactor tank with a first aeration system disposed in a bottom portion of said sequencing batch reactor tank, said first aeration system having a plurality of air nozzles which provide pressurized air to said sequencing batch reactor tank, said first aeration system being active for said reaction cycle time period and turned off at a conclusion of said reaction cycle time period;

(z) aerating said homogeneous slurry within said receiving tank with a second aeration system disposed in a bottom portion of said receiving tank, said second aeration system having a plurality of air nozzles which provide said pressurized air to said receiving tank;

(aa) providing a main blower connected to said first aeration system and said second aeration system, said main blower supplying said pressurized air to said first aeration system and said second aeration system;

(bb) providing an exhaust blower connected to said plurality of biofilters to withdraw said contaminated air from said receiving tank and said sequencing batch reactor tank and provide said contaminated air to said plurality of biofilters;

(cc) providing a three way valve having an inlet port connected to the discharge port of said trash pump, a first outlet port connected to an inlet port of said sequencing batch reactor tank and a second outlet port, said trash pump transferring said homogeneous slurry from said receiving tank through said three way valve to said sequencing batch reactor tank when said trash pump is activated and said three way valve is configured to pass fluids from the inlet port of said three way valve to the first outlet port of said three way valve;

(dd) providing a second recirculation line having one end connected to the second outlet port of said three way valve and an opposite end extending vertically downward into said receiving tank, wherein said trash pump circulates said homogeneous slurry through said second recirculation line into said receiving tank when said three way valve is configured to pass fluids from the inlet port of said three way valve to the second outlet port of said three way valve;

(ee) providing a system controller connected to said trash pump, said recirculation pump, said storage tank supply pump, said first discharge pump and said second discharge pump to selectively activate and deactivate said trash pump, said recirculation pump, said storage tank supply pump, said first discharge pump and said second discharge pump, said system controller providing for a manual mode of operation and an automatic mode of operation;

(ff) setting said three way valve to provide for a fluid flow of said homogenous slurry from said receiving tank to said sequencing batch reactor tank or setting said three way valve to provide for said fluid flow of said homogenous slurry from said receiving tank through said second recirculation line to said receiving tank, wherein said system controller is connected to said three way valve to control operation of said three way valve; and (gg) coordinating with said pH controller an activation and deactivation of said storage tank supply pump to insure timely transfers of said solution of fifty percent sodium hydroxide to said first recirculation line to neutralize carboxylic acids within said homogeneous slurry and maintain said approximately neutral pH, wherein said system controller coordinates with said pH controller the activation and deactivation of said storage tank supply pump to insure said timely transfers of said solution of fifty percent sodium hydroxide to said first recirculation line to neutralize said carboxylic acids within said homogeneous slurry and maintain said approximately neutral pH.

10. The method of claim 9 wherein said reaction cycle time period is between approximately five and ten days.

11. The method of claim 9 further comprising the step of controlling foaming of said homogeneous slurry within sequencing batch reactor tank by providing a spray head connected to the opposite end of said first recirculation line, said spray head being located in the upper portion of said sequencing batch reactor tank.

12. The method of claim 9 wherein said concentrated solution of nutrients includes nitrogen, phosphorus, and commercial products that provide said organic and inorganic nutrients to said homogeneous slurry.

13. The method of claim 9 wherein naturally occurring bacteria within said oily waste degrade said hydrocarbons in said homogeneous slurry while said homogeneous slurry is circulating through said sequencing batch reactor tank, said concentrated solution of nutrients providing growth for said naturally occurring bacteria.

14. The method of claim 9 comprising the step of entering into said system controller operating data including a number for the days that said sequencing batch reactor tank will run to biological degrade said oily waste, a volume of said oily waste for transfer from said receiving tank through said three way valve to said sequencing batch reactor tank, a dilution factor for diluting said oily waste with a permeate or water, and a settling time for said supernatant and solid waste within said oily waste to settle to the bottom of said sequencing batch reactor tank, wherein an operator provides said operating data to said system controller when said system controller is operating in said auto automatic mode of operation.

15. The method of claim 9 wherein said clean effluent having less than 100 ppm of said hydrocarbons is environmentally safe and dischargeable into a municipal water system.

16. An apparatus for the biological degradation of oily waste comprising:
 (a) a receiving tank for receiving said oily waste and then diluting said oily waste with water to produce a homogenous slurry, said receiving tank having an outlet port;
 (b) a trash pump having an inlet port connected to the outlet port of said receiving tank and a discharge port;
 (c) a three way valve having an inlet port connected to the discharge port of said trash pump, a first outlet port and a second outlet port;
 (d) a sequencing batch reactor tank connected to the first outlet port of said three way valve to receive said homogeneous slurry from said receiving tank, said trash pump transferring said homogeneous slurry from said receiving tank through said three way valve to said sequencing batch reactor tank when said trash pump is activated and said three way valve is set to a first fluid flow position to pass fluids from said inlet port of said three way valve to said first outlet port of said three way valve, wherein said sequencing batch reactor tank comprises a bioreactor tank having a capacity of 10,000 gallons;
 (e) a first recirculation line having one end connected to a first outlet port located at the bottom of said sequencing batch reactor tank and an opposite end extending inward into an upper portion of said sequencing batch reactor tank;
 (f) a recirculation pump located within said first recirculation line for circulating said homogeneous slurry through said first recirculation line and said sequencing batch reactor tank for a reaction cycle time period when said recirculation pump is activated;
 (g) a nutrient tank connected to said first recirculation line upstream from said recirculation pump, said nutrient tank supplying a concentrated solution of nutrients to said homogeneous slurry as said homogeneous slurry flows through said first recirculation line wherein said concentrated solution of nutrients provide amino acids and vitamins to said homogeneous slurry;
 (h) a pH controller coupled to said first recirculation line to monitor said homogeneous slurry flowing through said first recirculation line;
 (i) a storage tank supply pump having an inlet port and a discharge port connected to said first recirculation line;
 (j) a storage tank connected to the inlet port of said storage tank supply pump, said storage tank containing a solution of fifty percent sodium hydroxide, said storage tank supply pump when activated transferring said solution of fifty percent sodium hydroxide to said first recirculation line to neutralize carboxylic acids produced during initial degradation of hydrocarbons within said homogeneous slurry and maintain an approximately neutral pH;
 (k) said ph controller being connected to said storage tank supply pump, said pH controller being used to activate and deactivate said storage tank supply pump wherein an activation of said storage tank supply pump transfers said solution of fifty percent sodium hydroxide to said first recirculation line to neutralize carboxylic acids within said homogeneous slurry and maintain said approximately neutral pH;
 (l) said recirculation pump being deactivated to allow supernatant and solid waste within said sequencing batch reactor tank to settle to the bottom of said sequencing batch reactor tank;
 (m) a discharge line having one end connected to a second outlet port located at the bottom of said sequencing batch reactor tank, said discharge line including a first discharge pump and a second discharge pump;
 (n) an ultrafiltration unit located within said discharge line downstream from said second discharge pump, wherein said ultrafiltration unit has ultrafiltration membranes;
 (o) a bag filter located within said discharge line upstream from said ultrafiltration unit and downstream from said first discharge pump, said bag filter removing substantially larger particles of said supernatant and solid waste withdrawn from said sequencing batch reactor tank which reduces fouling of the ultrafiltration membranes of said ultrafiltration unit, wherein said first discharge pump when activated transfers said supernatant and solid waste from said sequencing batch reactor tank through said discharge line to said bag filter and said second discharge pump transfers said supernatant and solid waste from said bag filter through said discharge line to said ultrafiltration unit;
 (p) said ultrafiltration unit removing substantially smaller suspended particles of said supernatant and solid waste withdrawn from said sequencing batch reactor tank, said ultrafiltration unit discharging a clean effluent having less than 100 ppm of said hydrocarbons;
 (q) a plurality of biofilters connected to the upper portion of said sequencing batch reactor tank and said receiving tank, each of said plurality of biofilters having compost contained therein;
 (r) an exhaust blower connected to said plurality of biofilters, said exhaust blower withdrawing contaminated air from said receiving tank and said sequencing batch reactor tank to said plurality of biofilters wherein said contaminated air passes through said plurality of biofilters such that the compost in each of said plurality of biofilters captures and degrades volatilized hydrocarbons, ammonia, and hydrogen sulfide within said contaminated air;

(s) a first aeration system disposed in a bottom portion of said sequencing batch reactor tank, said first aeration system having a plurality of air nozzles which provide pressurized air to said sequencing batch reactor tank to aerate said homogeneous slurry as said homogeneous slurry circulates through said sequencing batch reactor tank, said first aeration system being active for said reaction cycle time period and turned off at a conclusion of said reaction cycle time period;

(t) a main blower connected to said first aeration system, said main blower supplying said pressurized air to said first aeration system;

(u) a second recirculation line having one end connected to the second outlet port of said three way valve and an opposite end extending vertically downward into said receiving tank, said trash pump circulating said homogeneous slurry through said second recirculation line and said receiving tank when said trash pump is activated and said three way valve is set to a second fluid flow position to pass fluids from said inlet port of said three way valve to said second outlet port of said three way valve;

(v) a second aeration system disposed in a bottom portion of said receiving tank, said second aeration system having a plurality of air nozzles connected to said main blower to provide said pressurized air from said main blower to said receiving tank to aerate said homogeneous slurry within said receiving tank;

(w) a holding tank connected to an opposite end of said discharge line wherein said holding tank receives and stores therein said clean effluent from said ultrafiltration unit;

(x) a system controller connected to said trash pump, said recirculation pump, and said first and second discharge pumps to selectively activate and deactivate said trash pump, said recirculation pump, said first discharge pump and said second discharge pump, said system controller providing for a manual mode of operation and an automatic mode of operation for said apparatus for the biological degradation of said oily waste, wherein said pH controller maintains a pH of 7.0 to 7.5 within said homogeneous slurry as said homogeneous slurry circulates through said sequencing batch reactor tank by coordinating with said system controller the activation of said storage tank supply pump which injects said solution of fifty percent sodium hydroxide from said storage tank into said first recirculation line;

(y) said system controller being connected to said three way valve, wherein said system controller controls said three way valve setting said three way valve to provide for a fluid flow of said homogenous slurry from said receiving tank to said sequencing batch reactor tank or setting said three way valve to provide for said fluid flow of said homogenous slurry from said receiving tank through said second recirculation line to said second aeration system disposed in a bottom portion of said receiving tank; and (z) said system controller being connected to said pH controller and said storage tank supply pump, said system controller coordinating with said pH controller an activation and deactivation of said storage tank supply pump to insure timely transfers of said solution of fifty percent sodium hydroxide to said first recirculation line to neutralize said carboxylic acids within said homogeneous slurry and maintain said approximately neutral pH.

* * * * *